(12) United States Patent
Huang et al.

(10) Patent No.: US 8,004,533 B2
(45) Date of Patent: Aug. 23, 2011

(54) GRAPHICS INPUT COMMAND STREAM SCHEDULING METHOD AND APPARATUS

(75) Inventors: Hsilin Huang, Milpitas, CA (US); Boris Prokopenko, Milpitas, CA (US); John Brothers, Calistoga, CA (US)

(73) Assignee: VIA Technologies, Inc., Taipei (TW)

( * ) Notice: Subject to any disclaimer, the term of this patent is extended or adjusted under 35 U.S.C. 154(b) by 1103 days.

(21) Appl. No.: 11/530,052

(22) Filed: Sep. 8, 2006

(65) Prior Publication Data

US 2007/0091101 A1    Apr. 26, 2007

Related U.S. Application Data

(60) Provisional application No. 60/730,444, filed on Oct. 26, 2005.

(51) Int. Cl.
*G06T 1/20* (2006.01)
(52) U.S. Cl. .................................................. 345/506
(58) Field of Classification Search .................. 345/506
See application file for complete search history.

(56) References Cited

U.S. PATENT DOCUMENTS

| | | |
|---|---|---|
| 4,855,936 A | 8/1989 | Casey et al. |
| 4,862,155 A | 8/1989 | Dalrymple et al. |
| 4,916,301 A | 4/1990 | Mansfield et al. |
| 5,097,411 A | 3/1992 | Doyle et al. |
| 5,230,039 A | 7/1993 | Grossman et al. |
| 5,293,587 A | 3/1994 | Deb et al. |
| 5,299,309 A | 3/1994 | Kuo et al. |
| 5,315,696 A | 5/1994 | Case et al. |
| 5,706,478 A | 1/1998 | Dye |
| 6,161,154 A * | 12/2000 | Schultz et al. .................. 710/56 |
| 6,208,361 B1 | 3/2001 | Gossett |
| 6,252,610 B1 | 6/2001 | Hussain |
| 6,329,996 B1 | 12/2001 | Bouen et al. |
| 6,363,438 B1 * | 3/2002 | Williams et al. ................. 710/22 |
| 6,476,808 B1 | 11/2002 | Kuo et al. |
| 6,483,505 B1 | 11/2002 | Morein et al. |
| 6,708,269 B1 | 3/2004 | Tiruvallur et al. |
| 6,782,432 B1 | 8/2004 | Nelson et al. |
| 6,806,880 B1 | 10/2004 | Mukherjee et al. |
| 6,833,831 B2 | 12/2004 | Emberling et al. |
| 6,867,781 B1 | 3/2005 | Van Hook et al. |
| 6,954,204 B2 | 10/2005 | Zatz et al. |
| 7,353,369 B1 | 4/2008 | Coon et al. |
| 2003/0001840 A1 | 1/2003 | Spitzer et al. |
| 2003/0023971 A1 | 1/2003 | Martinolich et al. |
| 2003/0160793 A1 * | 8/2003 | Emberling et al. ........... 345/506 |
| 2003/0169259 A1 | 9/2003 | Lavelle et al. |
| 2004/0008200 A1 | 1/2004 | Naegle et al. |

(Continued)

*Primary Examiner* — Xiao Wu
*Assistant Examiner* — Edward Martello
(74) *Attorney, Agent, or Firm* — Thomas, Kayden, Horstemeyer & Risley, LLP

(57) ABSTRACT

A command parser in a GPU is configured to schedule execution of received commands and includes a first input coupled to a scheduler. The first command parser input is configured to communicate bus interface commands to the command parser for execution. A second command parser input is coupled to a controller that receives ring buffer commands from the scheduler in association with a new or previously-partially executed ring buffer, or context, which are executed by the command parser. A third command parser input coupled to a command DMA component that receives DMA commands from the controller that are also contained in the new or previously-partially executed ring buffer, which are forwarded to the command parser for execution. The command parser forwards data corresponding to commands received on one or more the first, second, and third inputs via one or more outputs.

25 Claims, 10 Drawing Sheets

U.S. PATENT DOCUMENTS

| | | |
|---|---|---|
| 2004/0135787 A1 | 7/2004 | Parikh et al. |
| 2004/0160446 A1* | 8/2004 | Gosalia et al. ............. 345/503 |
| 2004/0187122 A1* | 9/2004 | Gosalia et al. ............. 718/100 |
| 2004/0189650 A1 | 9/2004 | Deering |
| 2005/0030311 A1 | 2/2005 | Hara et al. |
| 2005/0046633 A1 | 3/2005 | Aleksic et al. |

* cited by examiner

GRAPHICS INPUT COMMAND STREAM SCHEDULING METHOD AND APPARATUS

CROSS REFERENCE TO RELATED APPLICATION

This application claims priority to copending U.S. provisional application entitled, "GPU SYNCHRONIZATION AND SCHEDULING SYSTEM, METHOD, AND APPARATUS," having application Ser. No. 60/730,444, filed Oct. 26, 2005, which is entirely incorporated herein by reference.

TECHNICAL FIELD

The present disclosure relates to graphics processing and, more particularly, to a system and method for input command stream scheduling in a graphics-processing unit.

BACKGROUND

Today's computer systems typically include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as a graphics card in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

It is not uncommon for a typical coprocessor to schedule its processing workload in an inefficient manner. In some operating systems, a GPU may be multitasked using an approach that submits operations to the GPU in a serialized form such that the GPU executes the operations in the order in which they were received. One problem with this approach is that it does not scale well when many applications with differing priorities access the same resources. In this nonlimiting example, a first application that may be currently controlling the resources of a GPU coprocessor needs to relinquish control to other applications for the other applications to accomplish their coprocessing objectives. If the first application does not relinquish control to the other waiting application, the GPU may be effectively tied up such that the waiting application is bottlenecked while the GPU finishes processing the calculations related to the first application. As indicated above, this may not be a significant bottleneck in instances where a single graphically intensive application is active; however, the problem of tying up a GPU or other coprocessor's resources may become more accentuated when multiple applications attempt to use the GPU or coprocessor at the same time.

The concept of apportioning processing between operations has been addressed with the concept of interruptible CPUs that context switch from one task to another. More specifically, the concept of context save/restore has been utilized by modern CPUs that operate to save the content of relevant registers and program counter data to be able to resume an interrupted processing task. While the problem of apportioning processing between the operations has been addressed in CPUs, where the sophisticated scheduling of multiple operations is utilized, scheduling for coprocessors has not been sufficiently addressed.

At least one reason for this failure is related to the fact that coprocessors, such as GPUs, are generally viewed as a resource to divert calculation-heavy and time consuming operations away from the CPU so that the CPU may be able to process other functions. It is well known that graphics operations can include calculation-heavy operations and therefore utilize significant processing power. As the sophistication of graphics applications has increased, GPUs have become more sophisticated to handle the robust calculation and rendering activities.

Yet, the complex architecture of superscalar and EPIC-type CPUs with parallel functional units and out-of-order execution has created problems for precise interruption in CPUs where architecture registers are to be remained, and where several dozens of instructions are executed simultaneously in different stages of a processing pipeline. To provide for the possibility of precise interrupt, superscalar CPUs have been equipped with a reorder buffer and an extra stage of "instruction commit (retirement)" in the processing pipeline.

Current GPU versions use different type of commands, which can be referred as macroinstructions. Execution of each GPU command may take from hundreds to several thousand cycles. GPU pipelines used in today's graphics processing applications have become extremely deep in comparison to CPUs. Accordingly, most GPUs are configured to handle a large amount of data at any given instance, which complicates the task of attempting to apportion the processing of a GPU, as the GPU does not have a sufficient mechanism for handling this large amount of data in a save or restore operation. Furthermore, as GPUs may incorporate external commands, such as the nonlimiting example of a "draw primitive," that may have a long sequence of data associated with the command, problems have existed as to how to accomplish an interrupt event in such instances.

Because of this interruptability, the components of the GPU desirably should operate so as to change processing operations quickly. However, typical GPU processing pipelines may also be controlled by software drivers that typically send commands one-by-one to the GPU pipeline, thereby resulting in inefficient and slow operation in the event that a operation is interrupted or otherwise processed out of order. More specifically, GPU driving software might oftentimes be found to write comments for the GPU into memory, which are then followed with commands to the stream processing components of the GPU. In having to send such commands one-by-one, the serial stream places constraints on the GPU in the event that an interrupt event is desired but is merely placed in line to await its turn. The parsing component of the GPU, therefore, may not operate as efficiently as it might otherwise could due to these types of constraints of having to wait until commands are processed in a proscribed order.

Thus, there is a heretofore-unaddressed need to overcome these deficiencies and shortcomings described above.

SUMMARY

A GPU has a command parser that is configured to schedule execution of received commands and includes a first input coupled to a scheduler. The first command parser input is configured to communicate bus interface commands to the command parser for execution. A second command parser input is coupled to a controller in the GPU that receives ring buffer commands from the scheduler in association with a new or previously-partially executed ring buffer, which are executed by the command parser. A third command parser input coupled to a command DMA component in the GPU that receives DMA commands from the controller that are also contained in the new or previously-partially executed ring buffer, which are forwarded to the command parser for execution. The command parser forwards data corresponding to data received on one or more the first, second, and third inputs via one or more outputs.

For commands received on the first command parser input, such as a bus interface command, the command parser may send a synchronize command to one or more processing blocks configured for two-dimensional processing, such as the graphics pipeline, as one of ordinary skill in the art would know. The command parser may also send a synchronize command to one or more processing blocks configured for three-dimensional processing when bus interface commands are received by the command parser on the first input. In so doing, the command parser may insure that the processing of two-dimensional and three-dimensional components of related objects are processed in synchronized fashion in the GPU.

The commands received on the second command parser input may relate to a new ring buffer of commands and pointers or to a previously but partially executed ring buffer of commands and pointers. If the ring buffer is a new ring buffer that has not been previous and partially executed, the command parser may be configured to forward a ring buffer head pointer token to one or more processing units in the GPU for execution of data associated with the ring buffer. But if the ring buffer is one that has been previously and partially executed, meaning that it was previously interrupted, the command parser may resume command parsing at a precise point where previously interrupted in accordance with an offset value received from the controller on the second input. In either case, the command processor may send out data associated with the ring buffer until all commands thereto are parsed.

For the DMA commands received on the third input, the command parser may initiate a sequence to synchronize the received DMA commands in the GPU graphics pipeline. If the DMA command is from a new ring buffer, as described above, the command parser may forward a token through to a graphics pipeline to initiate processing of a first draw command associated with the received DMA command. The command parser may continue parsing commands for the ring buffer until all data has been sent out.

However, if the ring buffer from which the received DMA command is contained is one that is previously-partially executed, processing by the command parser may resume at a precise point in the received DMA command where previously interrupted. The precise point may correspond to an offset value communicated from the DMA command component on the second input. After resuming processing, the command parser may continue sending out data until execution of the ring buffer is complete.

Embodiments of the present disclosure can also be viewed as providing methods for a command parser in a GPU to schedule execution of received commands. In this regard, one embodiment of such a method, among others, can be broadly summarized by the following: receiving on a first input of the command parser that is coupled to a scheduler a bus interface command; receiving on a second input of the command parser that is coupled to a controller a ring buffer command associated with new or previously-partially executed context of commands and pointers, wherein a command of the new or previously-partially executed context is parsed; receiving on a third input of the command parser that is coupled to a command DMA component a DMA command corresponding to the new or previously-partially executed context of commands and pointers; and sending out on an output data associated with data received on one or more of the first, second, and third inputs.

One embodiment of the present disclosure provides a graphic processing unit which can be broadly summarized as: a command parser having at least a first, second, and third input and at least one output, the command parser being configured to output data in correspondence to commands received on one of the first, second, or third inputs; a scheduler coupled to the command parser according to the first input and configured to communicate bus interface commands for execution by the command parser; a controller coupled to the command parser according to the second input and configured to receive a ring buffer command from the scheduler upon receipt by the scheduler of a new or previously-partially executed context of commands and pointers, the command parser configured to execute commands associated with the new or previously-partially executed context of commands and pointers; and a command DMA component coupled to both the command parser by the third input and also to the controller, the command DMA component being configured to receive DMA commands from the controller that are contained in the new or previously-partially executed context of commands and pointers and to forward the DMA commands and a pointer associated to the DMA commands to the command parser.

DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

A graphics process may comprise a number of contexts, or operations, related to portions of the process being executed as a whole. As described herein, a context may represent all the state of the GPU at the time of a last execution (or initial execution) of the process on the GPU. The state may include the state registers, cache and memory contents, all the internal FIFOs, internal registers, etc. at the time of the last switch from one context to a different context, perhaps, as a nonlimiting example for a different process being executed by the GPU.

While it may not be practical to save an entire state of a GPU when a context is switched, the entire state may also not be needed, since a switch may be permitted to transpire between 1 to 3 milliseconds. During this time, the GPU can be configured to wrap up some level of processing so as to minimize an amount of a state that is saved.

Figure 1:
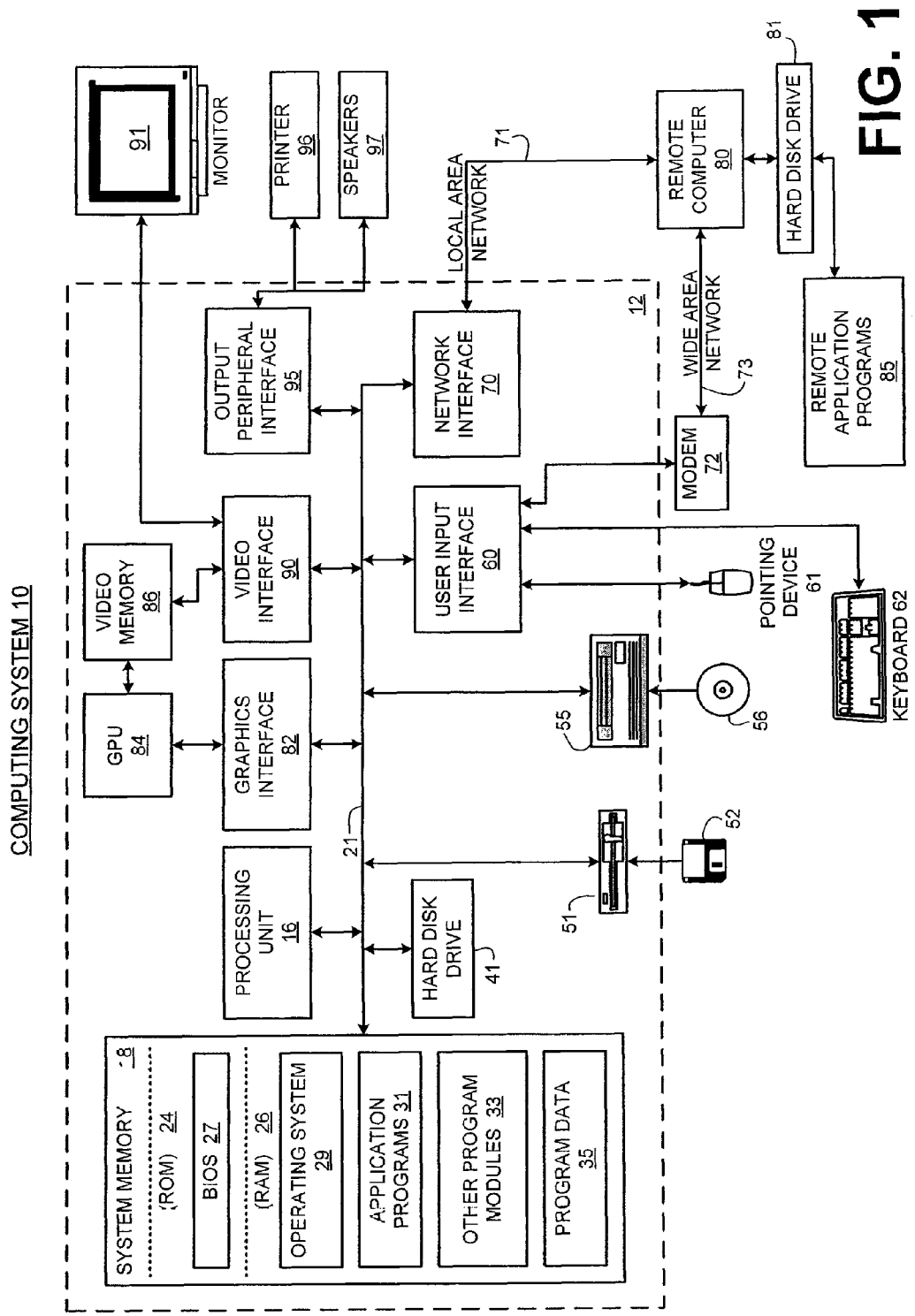
FIG. 1 is a diagram illustrating an exemplary nonlimiting computing device in which a context switch in a GPU may be implemented.

FIG. 1 is a diagram illustrating an exemplary nonlimiting computing device in which a context switch in a GPU may be implemented. FIG. 1 and the following discussion are intended to provide a brief general description of a suitable computing environment in connection with the disclosure herein. It should be understood, however, that handheld, portable, and other computing devices and computer objects of all kinds may be utilized in association with this disclosure as well. Consequently, while a general-purpose computer is described herein, it is but one nonlimiting example, and this disclosure may be implemented in a plurality of additional applications, as one of ordinary skill in the art would know.

The computing system 10 of FIG. 1 includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory which may be removable or nonremovable memory.

The system memory 18 may include computer storage media in the form of volatile and/or nonvolatile memory, such as read only memory (ROM) 24 and random access memory (RAM) 26. A basic input/output system 27 (BIOS) may be stored in ROM 24. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard drive 41 may read from or write to nonremovable, nonvolatile magnetic media. A magnetic disk drive 51 may read from or write to a removable, nonvolatile magnetic disk 52. An optical disk drive 55 may read from or write to optical disk 56.

A user may enter commands and information into computer 12 through input devices such as keyboard 62 and pointing device 61. These devices are but nonlimiting examples, as one of ordinary skill in the art would know. Keyboard 62 and pointing device 61, however, may be coupled to processing unit 16 through a user input interface 60 that is coupled to system bus 21. However, one of ordinary skill in the art would know that other interface and bus structures such as a parallel port, game port, or a universal serial bus (USB) may also be utilized for coupling these devices to the computer 12.

One or more graphics processing units (GPUs) 84 may communicate with the graphics interface 82 that is coupled to system bus 21. As a nonlimiting example, GPU 84 may include on-chip memory storage, such as register storage and cache memory. GPU 84 may also communicate with a video memory 86, as desired. GPU 84, however, is but one nonlimiting example of a coprocessor, and thus a variety of coprocessing devices may be included with computer 12.

A monitor 91 or other type of display device may be also coupled to system bus 21 via a video interface 90, which may also communicate with video memory 86. In addition to monitor 91, computer system 10 may also include other peripheral output devices, such as printer 96 and speakers 97, which may be coupled via output peripheral interface 95.

Computer 12 may operate in a networked or distributed environments using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

As stated above, the GPU 84 may be configured to switch processes, or contexts, during the processing of another context, or operation. In this instance, the GPU 84 is configured to save an interrupted context and to initiate processing of another context, which itself may have been previously interrupted and saved.

GPU 84 may be configured to support sequential execution of multiple GPU programs (commands) belonging to the same context that have also the name of the "ring buffer," which comprises processor functions and command DMA (direct memory access) buffer pointers in memory. GPU 84 may switch from one context to another upon receipt of an interrupt command or upon reaching the end of a ring buffer. In the case of the interrupt command, the GPU 84 may save the state context so that it is able to continue execution of that context subsequent in time at the precise point saved.

Figure 2:
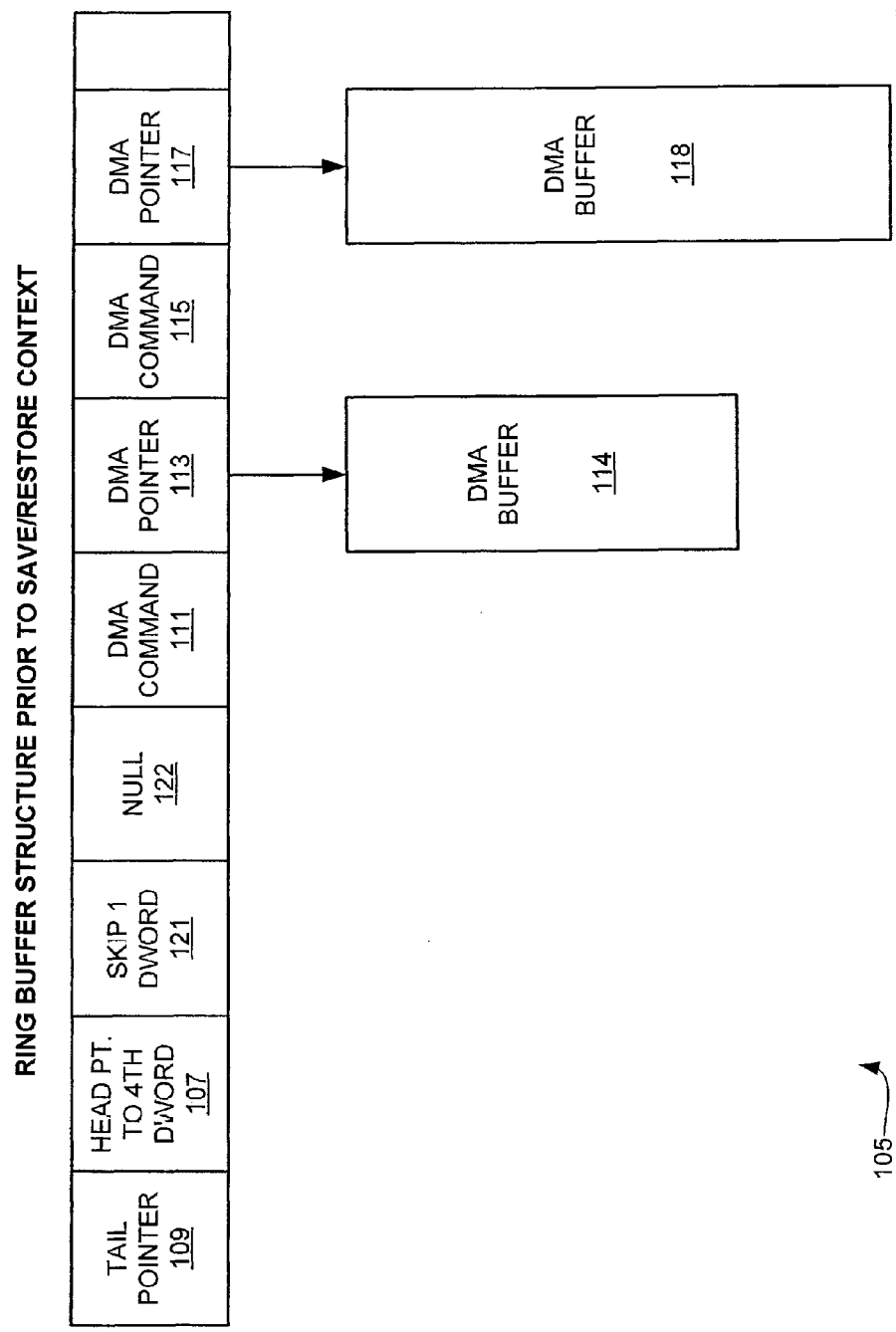
FIG. 2 is an illustration of an initial structure of a ring buffer that may exist prior to a first save/restore operation interrupting the processing of that ring buffer, which may be executed by the GPU of FIG. 1.

FIG. 2 is an illustration of an initial structure of a ring buffer 105 that may exist prior to a first save/restore operation interrupting the processing of that ring buffer. As stated above, a ring buffer, such as ring buffer 105, may comprise a string of commands and memory pointers associated with the execution of a context, which is described in greater detail below. Ring buffer 105 may contain a head pointer slot 107 and a tail pointer slot 109. Head pointer slot 107 may contain data regarding the logical location of processing the commands and pointers of the ring buffer 105, and the tail pointer slot 109 may store data corresponding to the logical end of the ring buffer 105. The tail pointer slot 109 may be updated during the context execution when more commands are added to the context.

The ring buffer 105 may also contain, in this nonlimiting example of FIG. 2, DMA memory command 111 and associated DMA pointer 113 that points to DMA buffer 114. DMA buffer 114 may contain commands and data related to the context for this ring buffer 105, such as draw commands, primitives, instances, and tiles, etc. Additionally, ring buffer 105 may contain additional DMA commands, such as DMA command 115, and associated DMA pointers, such as pointer 117, that point to a DMA buffer with commands and data, such as DMA buffer 118. Ring buffer 105 of FIG. 2 may also contain place holders 121 and 122 which, in this nonlimiting example, is skip 1 DWORD (double word) 121 and null position 122 to hold the place for a context save command and address pointer, respectively, after a save/restore operation, as described below.

In application, when GPU 84 may execute the ring buffer 105, GPU 84 may receive both head pointer 107 and tail pointer 109 and check for a saved context. Placeholder 121, which, in this nonlimiting example, is configured as a skip 1 DWORD, causes the GPU 84 to skip, or ignore, null 122 and go to the next command, which is DMA command 111. In this instance, the ring buffer 105 is not interrupted at this point, and GPU 84 otherwise continues to execute the commands and instructions of ring buffer 105 of FIG. 2 and also the contents of DMA buffers 114 and 118 (such as draw commands, primitives, instances, and tiles).

Figure 3:
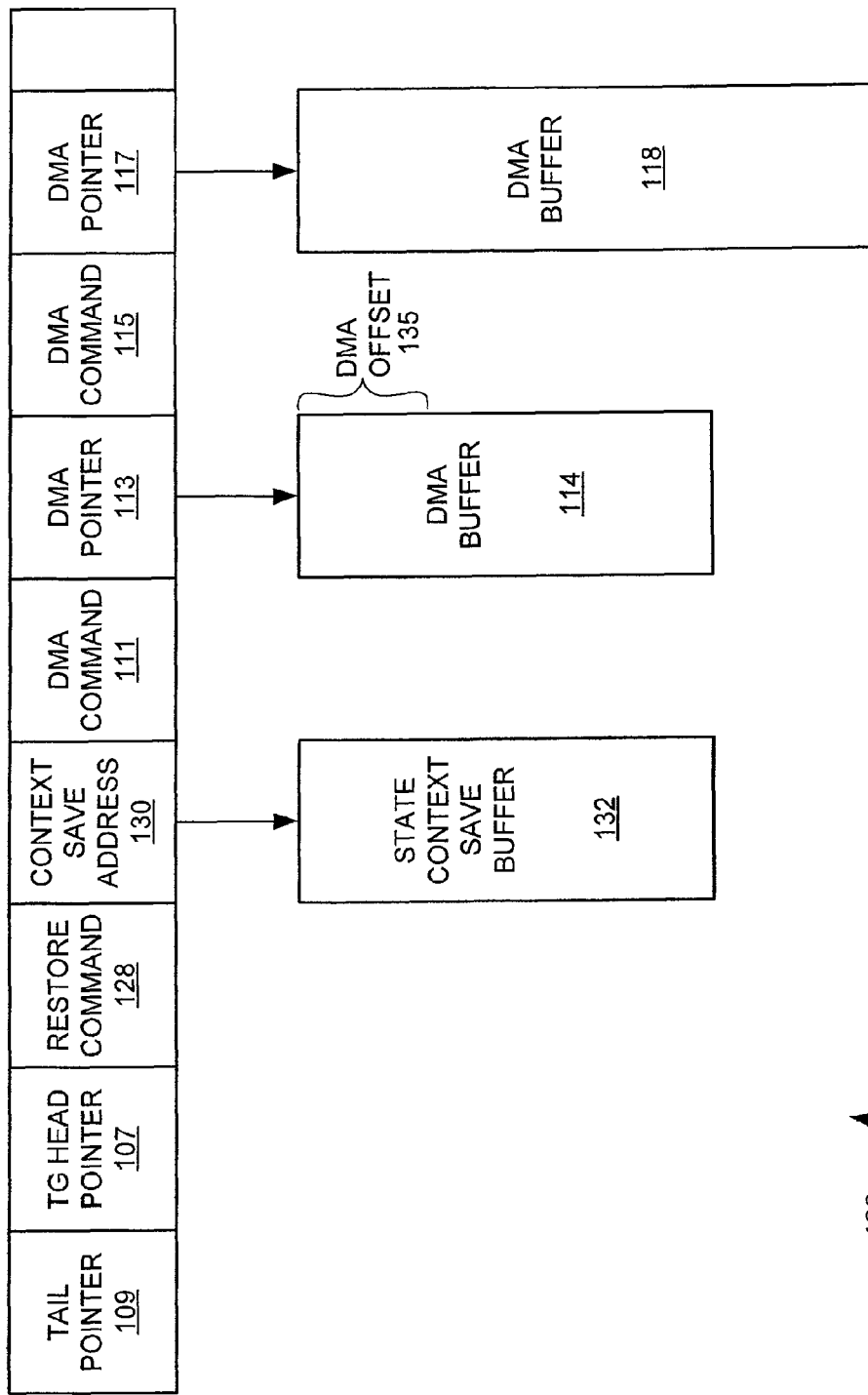
FIG. 3 is a diagram of a ring buffer after a save/restore context operation has been implemented, which also may be executed at a precise interrupt point by the GPU of FIG. 1.

FIG. 3 is a diagram of a ring buffer 126 after a save/restore context operation has been implemented. In this nonlimiting example, the placeholders 121 and 122 of the ring buffer 105 in FIG. 2 may be replaced by a restore command 128 and context save address 130. Context save address 130 may point to a state context save buffer 132 that contains information about a previously and partially processed context.

As the GPU 84 processes the ring buffer 126 of FIG. 3, upon recognizing restore command 128, GPU 84 may acknowledge the context save address 130 of a previous run state context that should be retrieved from state context save buffer 132. Data retrieved from state context save buffer 132 may also provide a DMA offset 135 for DMA buffer 114 so that processing can resume at the precise point interrupted.

GPU 84 may be configured to execute a sequential series of ring buffers that may be organized in a run list of ring buffers. As a nonlimiting example, a run list may contain a plurality of ring buffers for disparate contexts that execute when a proceeding ring buffer completes execution and/or is interrupted.

Figure 4:
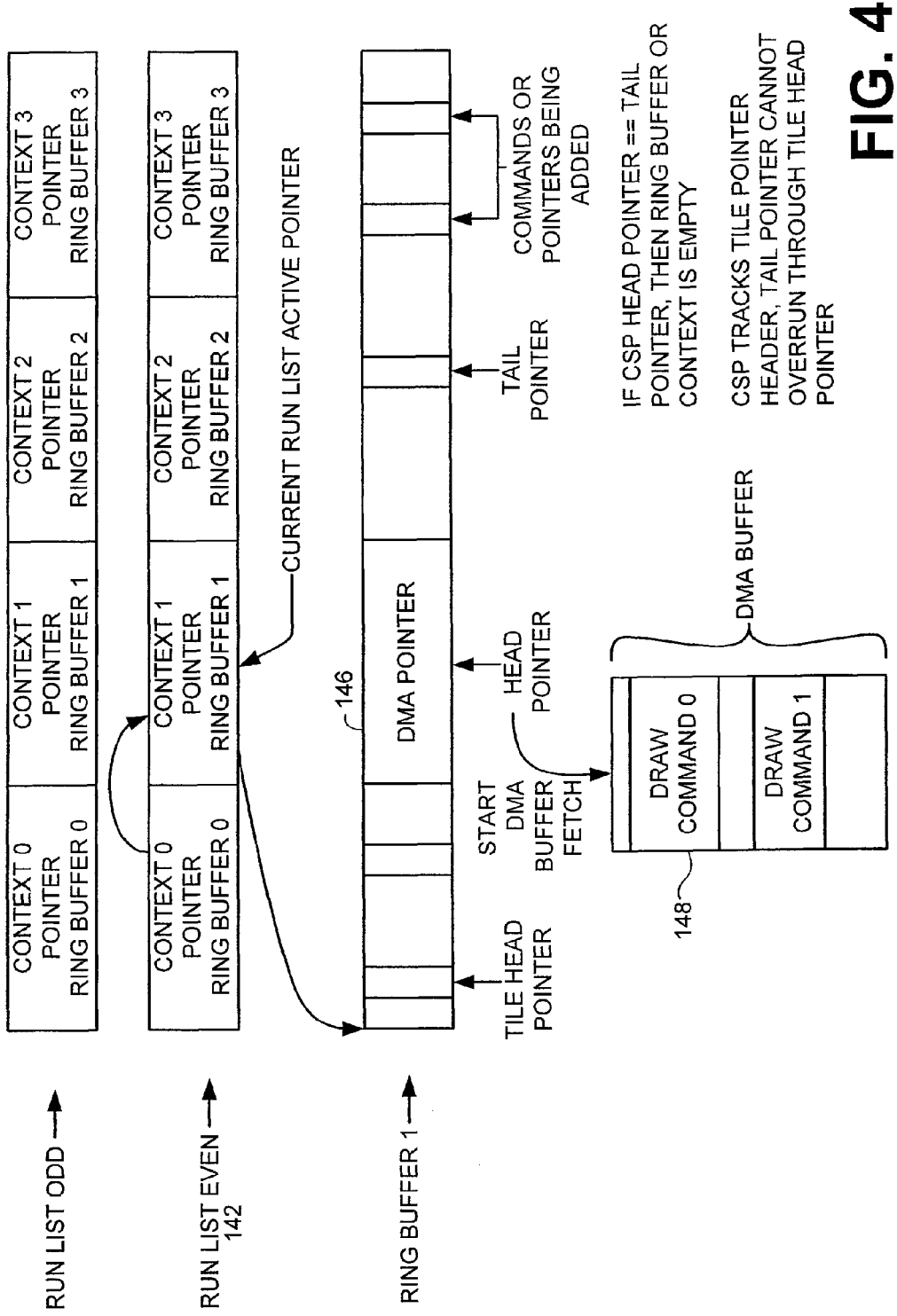
FIG. 4 is a diagram of multiple run lists that may contain one of the ring buffers of FIG. 2 or 3 and may be executed by the GPU of FIG. 1.

FIG. 4 is a diagram of multiple run lists that the GPU 84 may execute containing a plurality of contexts, each context having its own ring buffer, such as ring buffer 105 or 126 of FIG. 2 or 3, respectively. As shown in FIG. 4, GPU 84 may alternate execution of two run lists, including run list odd and run list even, as nonlimiting examples. Each run list may contain, in this nonlimiting example, four separate contexts including context 0, context 1, context 2, and context 3. The context 0-context 3 in each run list points to a separate ring buffer that may be executed by GPU 84, as described above.

In the nonlimiting example of FIG. 4, ring buffer 1 may be referenced in context 1 of run list even 142. In this nonlimiting example, ring buffer 1 may contain various GPU commands and/or DMA commands with DMA buffer pointers, such as described above in regard to ring buffers 105 and 126.

GPU 84 may receive the run list command and thereafter fill the context base address slot 0-3, as shown in FIG. 4, so as to establish a run list for execution. As also shown in FIG. 4, GPU 84 may thereafter start at context 0 of the run list to be executed, whether run list even or run list odd.

In this nonlimiting example, GPU 84 may have completed context 0 and moved to the next context, which is context 1 of run list even 142. In executing ring buffer 1 (for context 1), GPU 84 may access DMA pointer 146, which causes the DMA buffer 148 to be accessed. In this nonlimiting example, DMA buffer 148 contains draw command 0 and draw command 1, which is fetched when the head pointer reaches DMA pointer 146. As the head pointer moves logically from left to right down ring buffer 1, it will reach either a skip or restore command prior to DMA pointer 146, as described above. In this nonlimiting example of FIG. 4, the absence of a restore command causes the GPU 84 to start the DMA buffer fetch, which results in accessing a DMA buffer 148 and the processing of graphics related data contained in and/or referenced by the buffer, such as draw commands 0 and 1.

Figure 5:
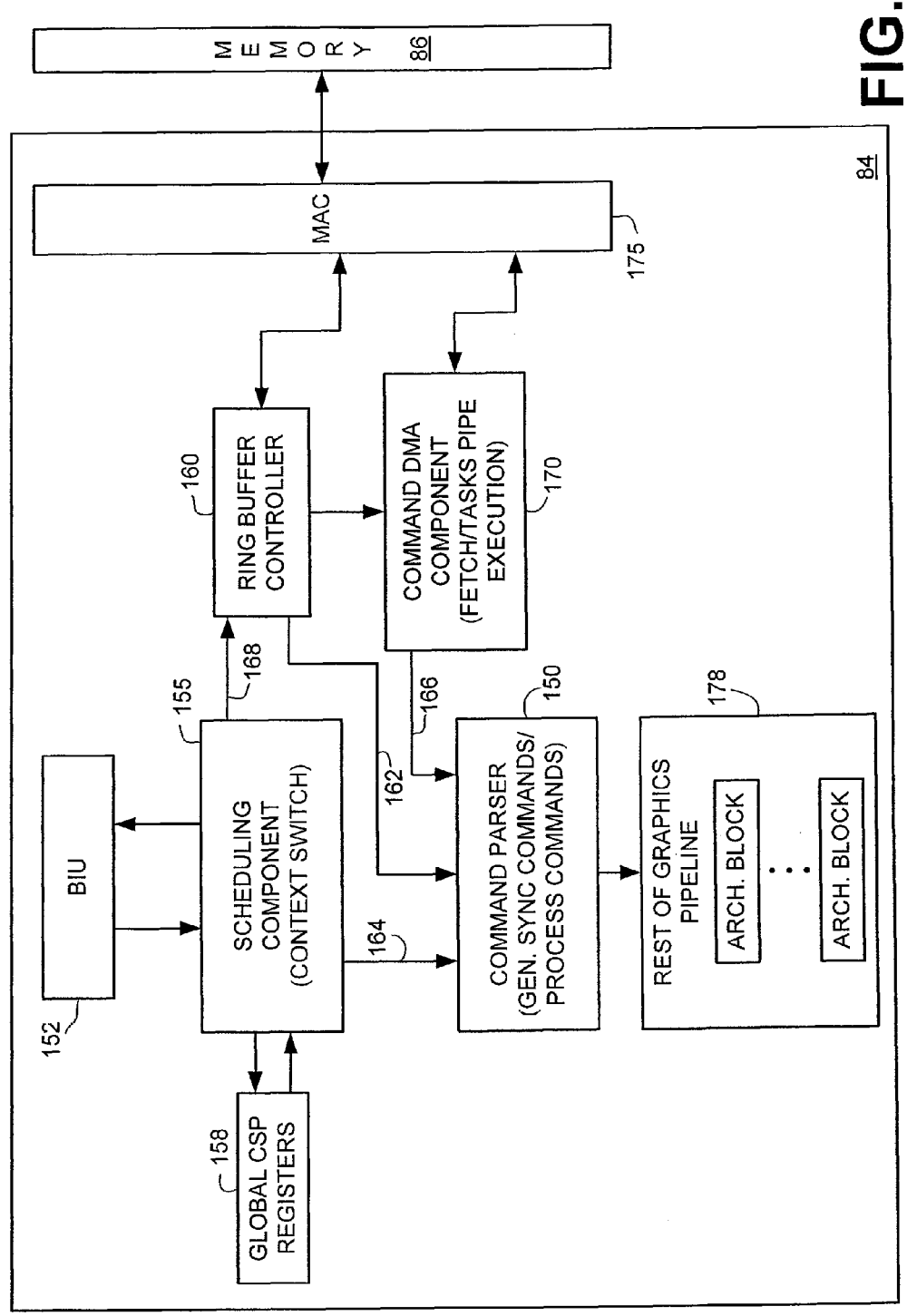
FIG. 5 is a diagram of select components found in the GPU of FIG. 1.

One of ordinary skill in the art would know that GPU 84 is controlled by a graphics driver software that sends commands to the GPU 84 for executing certain data. Thus, FIG. 5 is a diagram of GPU 84 with a select number of components of GPU 84 of FIG. 1 shown therein. Commands sent by the graphics driver software may be received by bus interface unit ("BIU") 152. These commands may be parsed or otherwise processed by command parser 150, which may be referred to herein as a controller. Thus, as described above, the BIU 152 may forward commands received from the graphics driver software to the command parser 150 for execution and processing. However, as also described above, the different types of commands that may be forwarded to the BIU 152 and onto command parser 150 may be of different types that may utilize different processing operations and be processed at different points in time. However, if the BIU 152 is coupled to the command parser 150 by single communication path, such commands received by the graphics driver software at the BIU 152 may be forwarded to command parser 150 on a one by one basis, thereby resulting in slower and inefficient operation.

However as disclosed herein, and also shown in FIG. 5, GPU 84 includes component 155 that is configured to schedule the BIU command run lists. As discussed above, run lists may contain a plurality of ring buffers. Accordingly, scheduling component 155, which may be referred to as a scheduler, may receive commands from BIU 152 and thereafter schedule execution of the run list based on the type of commands received by the graphics driver software.

Thus, when BIU 152 receives commands, those commands may be forwarded to component 155 for scheduling operations. Depending on the type of the command, the global CSP (command stream processor) register 158 may be set. If the command is related to a particular run list, a kickoff command may be sent to ring buffer controller 160 that is configured to control the execution of that ring buffer.

In this nonlimiting example of FIG. 5, command parser 150 has three separate inputs that are configured for communicating inputs to the command parser depending on the type of command to be executed and processed by command parser 150. As discussed above, when ring buffer controller 160 receives a run list for execution via a kickoff command path 168, a subsequent command may be sent to command parser 150 on path 162. Upon receipt of the communication on path 162, command parser 50 may execute a prescribed series of steps, as described in more detail below.

For bus interface unit operations, such as synchronizing processing components of GPU 84, component 155 may forward such commands along path 164 to the command parser 150. These BIU commands are thereafter executed according to a prescribed series of steps as well, as also described below.

Finally, as also described above in regard to ring buffers 105 and 126, the DMA commands that may be contained in a particular ring buffer may be forwarded from ring buffer controller 160 to command DMA Fetch/Tasks Pipe Execution Component 170 (also referred to as a command DMA component) which may interface with memory access controller 175 to fetch a particular DMA buffer, such as DMA buffer 114, from memory 86. Upon receipt of the DMA commands and associated data, the command DMA component 170 may forward that information to the command parser 150 and associated data via path 166. Thus, command parser 150 includes three separate data path inputs, including path 162, 164, and 166, thereby avoiding the one-by-one sequential execution process, as described above.

Command parser 150 may be configured to generate sequential commands and otherwise process commands received upon paths 162, 164, and 166. In doing so, the command parser 150 may control operation of the remaining parts of the graphic pipeline 178, which may contain one or more architectural processing blocks, as one of ordinary skill in the art would know, including, as a nonlimiting example, a triangle setup unit, an attribute setup, etc.

As discussed above, command parser 150 may be configured to process a variety of commands in regard to a ring buffer that may be contained in a run list. Ring buffer commands, DMA commands, and bus interface unit commands, all may be forwarded to command parser 150 for controlling the operation of the rest of graphics pipeline 178, but via separate input paths 162, 164, or 166.

Figure 6:
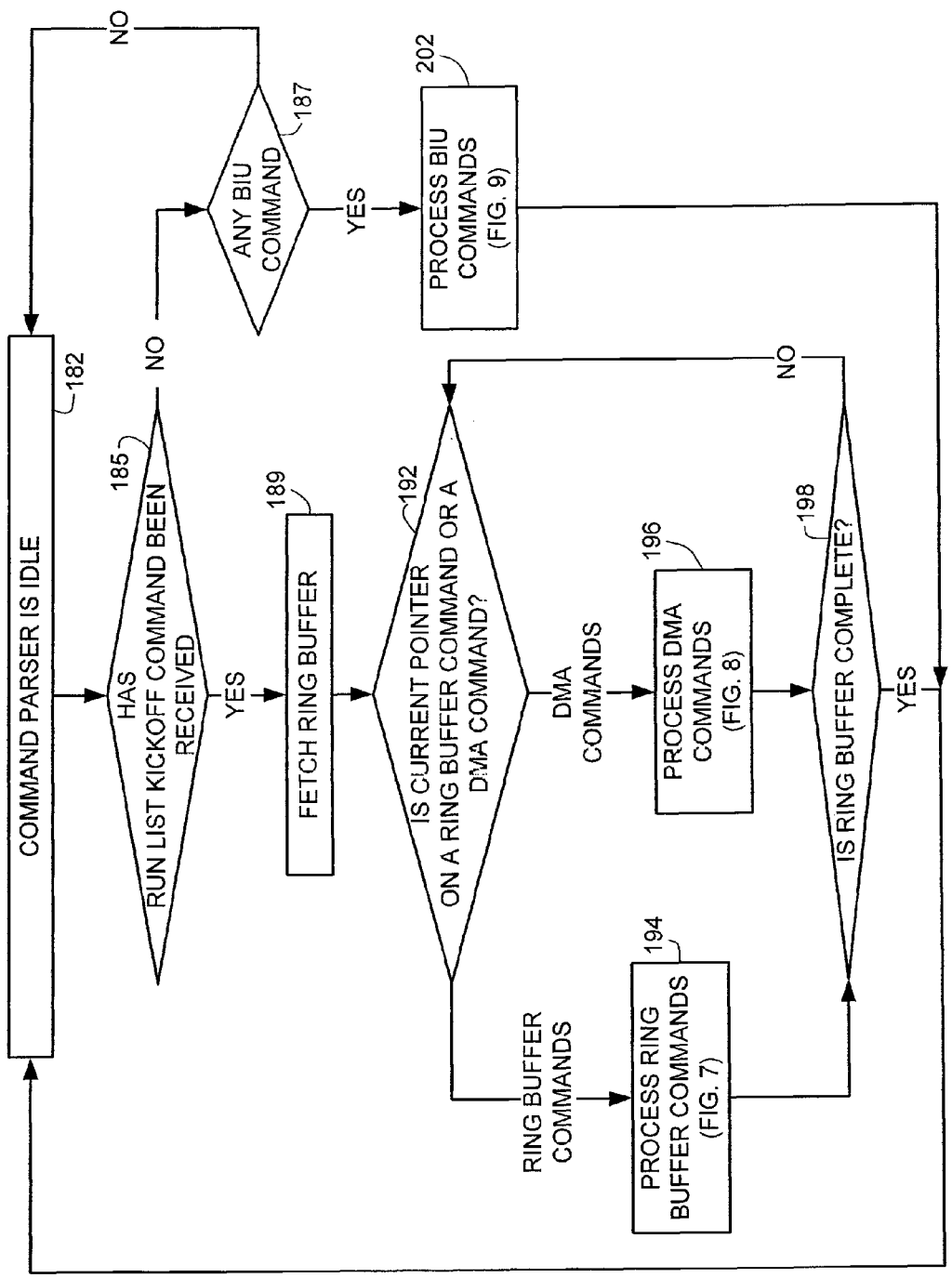
FIG. 6 is a flow chart diagram of a series of steps that may be configured as executable logic and implemented by command parser of FIG. 5.

FIG. 6 is a flow chart diagram 180 of a series of steps that may be configured as executable logic and implemented by command parser 150 in receiving the various types of commands from the components of GPU 84 in FIG. 5. One of ordinary skill in the art would readily appreciate that such logic may comprise programming that makes use of pattern-directed invocation of procedures from predetermined assertions and goals, such as those contained and discussed herein. Thus, one of ordinary skill in the art would know that the steps of FIG. 6-9 could be also configured as kickoff logic, parsing logic, forwarding logic, etc. in hardware, software, firmware, and the like.

Thus, in a first step 182, the command parser 150 may be in an initially idle state. However, when the graphics driver software forwards commands to the BIU 152, which are thereafter forwarded to scheduling component 155 for scheduling, command parser 150 may soon thereafter receive information via one of its inputs 162, 164, or 166. While the command parser 150 is idle, the command parser 150 may continuously check to see if a ring buffer kick off signal has been received, which may be a discrete signal.

Specifically, when a run list command is received by BIU 152, the scheduling component 155 may kick off that ring buffer. In one nonlimiting example, scheduling component 155 may actually support 4 ring buffers in a ring buffer, as described above and shown in FIG. 4. Thus, the scheduling component may kick off ring buffer controller 160 four times, once for each ring buffer in the run list. Also, the scheduling component 155 may cause the command parser 150 to switch to the parsing of commands received via path 162 from the ring buffer controller 160 by forwarding a communication to the command parser 150 on path 164.

If a kickoff signal is not received from the scheduling component 155, the command parser 150 may thereafter determine if any BIU commands have been received upon path 164, such as commands for the sequence of the graphic pipeline with execution unit pool blocks that may alternate between 2D and 3D execution of various data. If none of these commands have been received by the command parser 150, the command parser 150 remains idle, and step 182.

However, if the BIU 152 does receive a command from the graphics driver software for the computer of FIG. 1, the command is forwarded to the scheduling component 155, which thereafter may operate to set the registers of the CSP global register 158. This ring buffer to be processed is communicated upon path 168 to ring buffer controller 160. This communication of the ring buffer to ring buffer controller 160 corresponds to step 189 of FIG. 6, wherein the ring buffer is fetched for further processing. In step 192 of FIG. 6, the command parser 150 determines whether the head pointer of FIG. 4 is currently directed to a ring buffer command or a DMA command.

In the instance where the head pointer is pointing to a ring buffer command, as discussed above, the ring buffer controller 160 may extract such ring buffer commands, which may include sync commands, set register commands, and/or any draw commands which all may be forwarded upon path 162 to command parser 150. In this instance, the command parser 150 processes the ring buffer commands according to block 194, which discussed in more detail in regard to FIG. 7.

If the head pointer is instead directed to a DMA command, such as DMA command 111 of FIG. 2, a separate series of operations may take place. Specifically, ring buffer controller 160 may forward associated DMA pointers, such as DMA pointer 113 of FIG. 2 from ring buffer controller 160 to command DMA component 170. The command DMA component 170 may thereafter retrieve the data, or associated pointers, for a DMA buffer, such as DMA buffer 114, via memory access controller 175, which is configured to interface with memory 86 of FIG. 1. In gathering these pointers for the DMA structure associated with DMA pointer 113, the command DMA component 170 sends these DMA commands and gathered pointers along path 166 to command parser 150, which is a separate input line from data sent from ring buffer controller 160 to command parser 150. Thus in this instance, when DMA commands are forwarded from command DMA component 170 via path 166, command parser 150 proceeds to process DMA commands as shown in block 196 which is depicted in more detail in FIG. 8.

After processing the ring buffer commands in block 194 or the DMA commands in block 196, command parser 150 determines whether or not the head pointer for the ring buffer being processed has reached the tail pointer of FIG. 4 thereby signifying completion of the ring buffer. In the event that it has not, command parser 150 returns back to step 192 from block 198 to determine whether or not the head pointer is now currently pointing to a run or a DMA command, as previously described above. In the event that the result of step 198, which is a determination of whether or not the ring buffer is complete or, as stated above, the head pointer has reached the tail pointer for the ring buffer, command parser 150 returns to step 182 and resorts to an idle state awaiting additional commands.

As discussed above, the command parser 150 may receive bus interface unit commands in addition to the run list and DMA commands described above. In FIG. 6, if a run list kick off signal has not been received, in step 185, command parser 150 may determine whether any BIU commands have been received as well. If not, command parser 150 may remain in an idle state and step 182; however, if command parser 150 has received BIU commands on path 164 from component 155, the command parser 150 may thereafter process such BIU commands in step 202 which is discussed in more detail in FIG. 9. Nevertheless, upon completion of the BIU commands, the command parser 150 may return to idle state in step 182.

Figure 7:
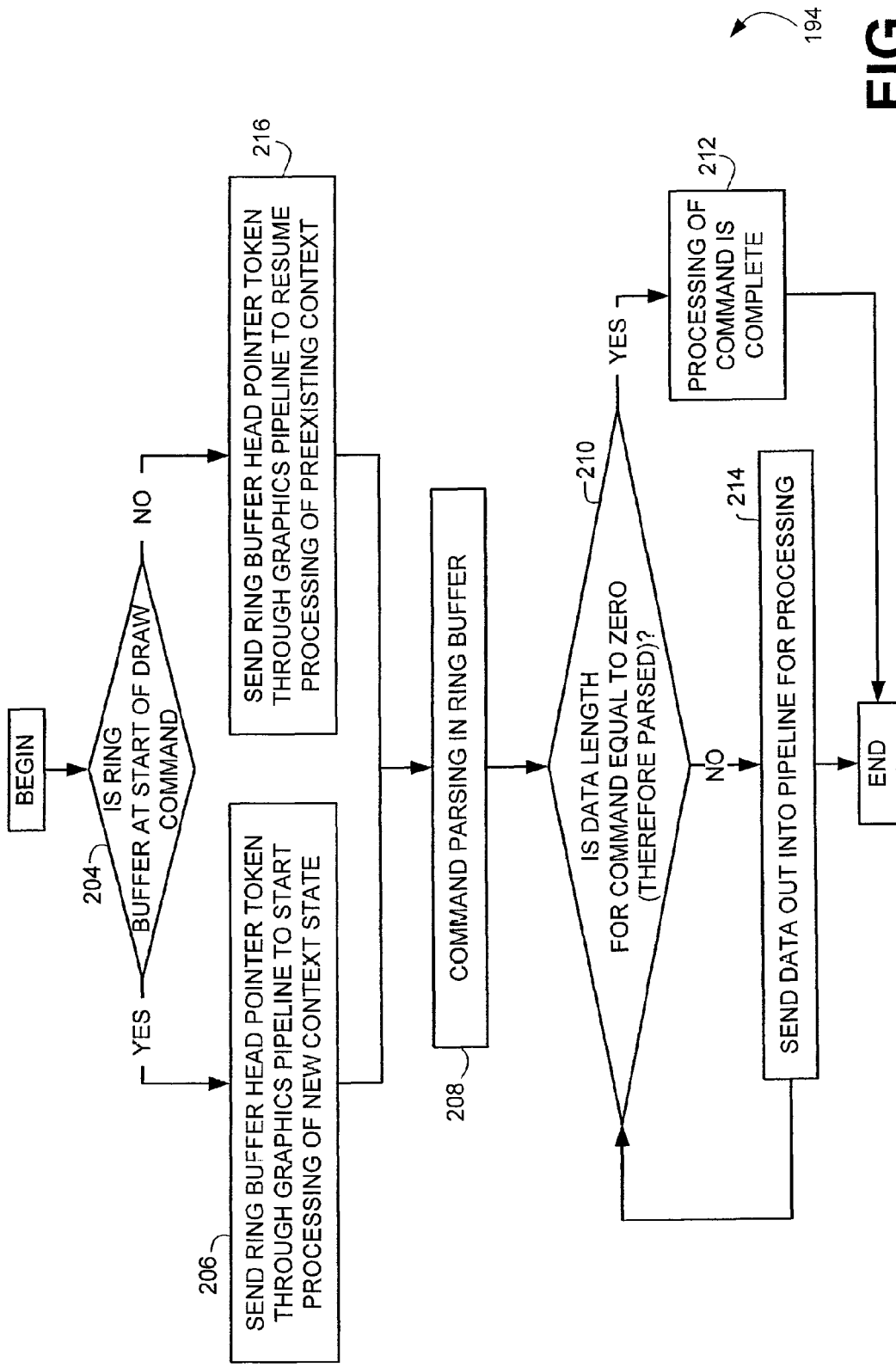
FIG. 7 is a flow chart diagram of the steps that may be configured as executable logic and implemented by command parser of FIG. 5 in processing run list commands in a ring buffer.

Thus, depending upon the input received by command parser 150 via paths 162, 164, 166, command parser 150 may take one of three different courses of action. FIG. 7 is a flow chart diagram 194 of the steps that may be configured as executable logic and implemented by command parser 150 of FIG. 5 in processing ring buffer commands in a ring buffer. In beginning the process 194, the command parser determined in step 204 whether the ring buffer is at the start of a draw command which may be contained in DMA buffer 148 of FIG. 4. As discussed above, a particular ring buffer may be initiated from its beginning or may be resumed after a previous session of processing that was interrupted for some reason to be thereafter resumed. Thus, in step 204, the command parser 150 determines whether the ring buffer is a new ring buffer or a previously but partially processed ring buffer so as to begin operations at the correct logical point.

If the command parser 150 determines that the ring buffer, such as ring buffer 105 of FIG. 2, is at the start of a draw command or the beginning of the ring buffer, the command parser 150 moves to step 206 and forwards the ring buffer head pointer token through the graphics pipeline 178 so as to start processing of that new context associated with ring buffer 105.

In step 208, command parser 150 engages in command parsing in the ring buffer 105 of FIG. 2. Thereafter, in step 210, the command parser 150 determines whether the data length for the command in the ring buffer 105 is equal to zero or not, which corresponds to whether or not the data is therefore parsed. If so, which means the data equals zero, command parser 150 moves to step 212 in recognition of completion of the command. As stated another way, command parser 150 recognizes that the head pointer of ring buffer 1 in FIG. 4 has reached the tail pointer, therefore, signifying completion of that ring buffer In this instance, the processing of the ring buffer commands for flow chart 194 is complete.

However, if the data length for the command parsing in step 210 is not zero, command parser 150 moves to step 214. In step 214, command parser 150 sends out data associated with the command being processed into the rest of the graphics pipeline 178 for further processing. Steps 210 and 214 may be repeated until all the data is sent out such that the commands associated with ring buffer 105 of FIG. 2 are fully parsed and executed. At this juncture, the execution of ring buffer 105 of FIG. 2 in this nonlimiting example as depicted in FIG. 7 would otherwise be complete.

However, returning to step 204, if command parser 150 determines that the ring buffer 1 was previously, but partially processed at an earlier time, command parser 150 resumes command parsing in the ring buffer 126 where previously halted. Command parser resumes operations based on the logical position of the head pointer and tail pointer of the ring buffer, as shown in step 216, which provides that the head pointer is forwarded through the pipeline 178. Command parsing follows in step 208, as described above. Thus, step 210 ultimately follows for the determination of whether the data length for command is equal to zero, thereby signifying that the command is fully parsed. Data may be sent out into the rest of the graphics pipeline 178 repeatedly until the result of step 210 is a yes, thereby signifying completion of process 194 of FIG. 7.

Figure 8:
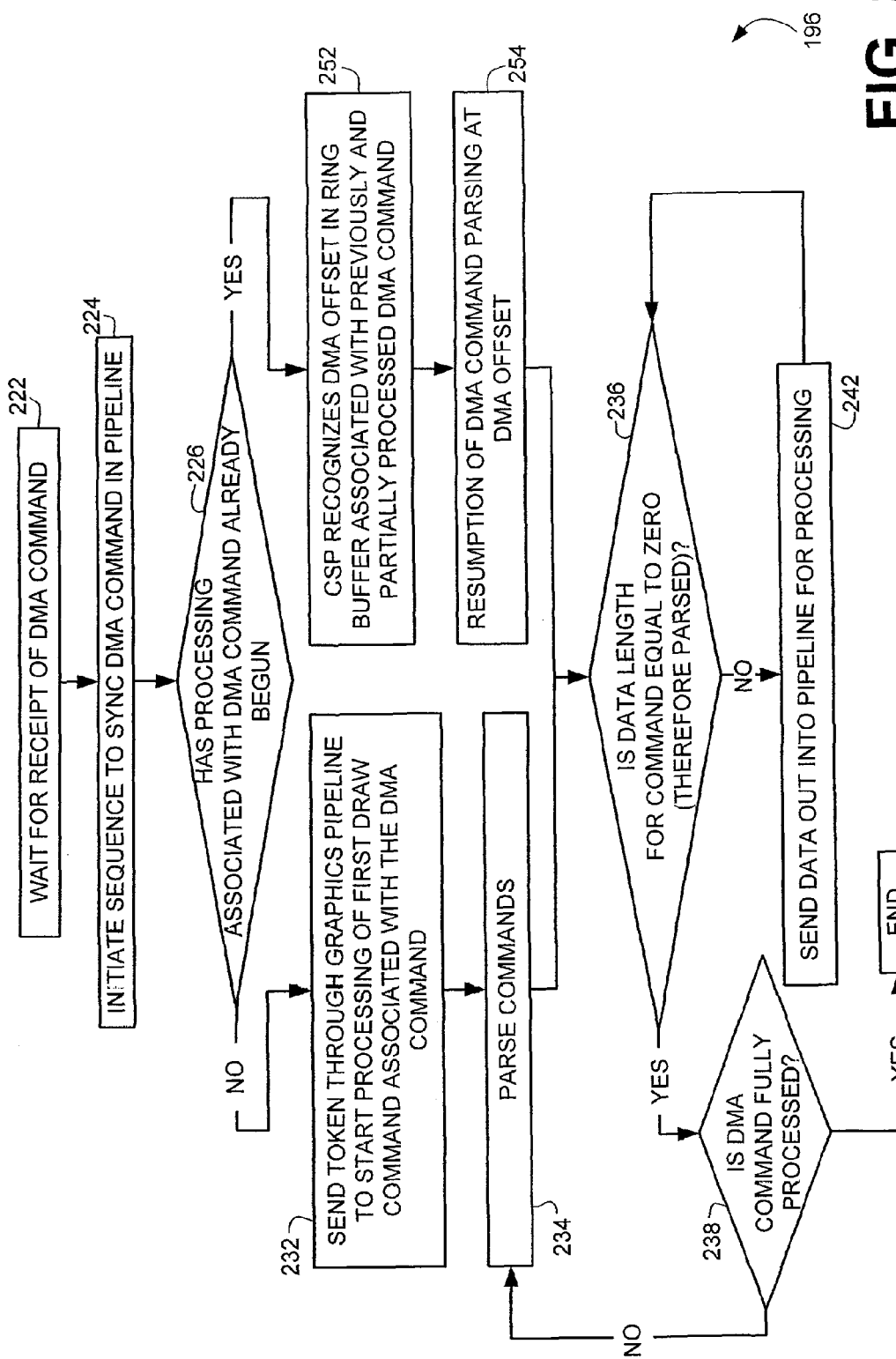
FIG. 8 is a flow chart diagram of the steps that may be configured as executable logic and implemented by command parser of FIG. 5.

If at step 192 of FIG. 6, command parser 150 determines that a DMA command has been received on path 166 from command DMA component 170 of FIG. 5, command parser 150 may then move to block 196, the steps of which are depicted in FIG. 8. More specifically, in step 222 of FIG. 8, command parser 150 may be waiting for the receipt of the DMA command on path 166 from command DMA component 170. Upon receipt, in step 224, command parser 150 may initiate a sequence to synchronize the DMA command in the rest of the pipeline 178 (FIG. 5).

Thereafter, command parser 150 may determine in step 226 whether processing associated with received DMA command may have already begun at a previous time. If not, command parser 150 moves to step 232 so as to send a token through the rest of the graphics pipeline 178 that initiates processing of the first draw command associated with the received DMA command. Specifically, as shown in FIG. 4, upon receipt of the DMA pointer 146 associated with ring buffer 1, command parser 150 would thereafter send drawing command 0 associated with DMA buffer 148 through the rest of graphics pipeline 178. In doing so, command parser 150 would thereafter parse the associated commands, as shown in step 234. This process would be completed until step 236, which provides for the determination of the data link for the command, as described above. Specifically, step 236 calls for a determination to be made as to whether the data link of the command being processed equals zero, thereby signifying completion of parsing. If the data length is not equal to zero, the data associated with the command may be sent to the rest of the pipeline 178 for further processing, as shown in step 242. However, if the data length being parsed by command parser 150 is equal to zero, therefore, fully parsed, the next step by command parser 150 is decision step 238 to determine whether or not the DMA command, such as draw command 0 of FIG. 4, is fully processed. If not, additional parsing in step 234 would take place. However, if so, the end of the process is reached and operation returns to flow chart 180 of FIG. 6.

Returning to step 226, if command parser 150 determines that processing associated with the received DMA command as a result of step 192 of FIG. 6 has been previously initiated, the command parser 150 moves to step 252 and recognizes the DMA offset associated with the previously processed ring buffet. As described above, ring buffer 126 may correlate to a ring buffer structure having been previously but partially processed. In this instance, the command parser 150 may recognize DMA offset 135 in step 252 to resume processing at the position associated with DMA offset 135. Therefore, in step 252, resumption of DMA command parsing would begin according to the DMA offset 135 thereafter followed by a determination of whether the data length for the command is being equal to zero or not. This process is depicted in steps 236, 238, and 242. The continued parsing of commands (step 234) would resume until all DMA commands in this DMA of the ring buffer structure are fully processed, thereby identifying the end of the flow chart 196 of FIG. 8.

Figure 9:
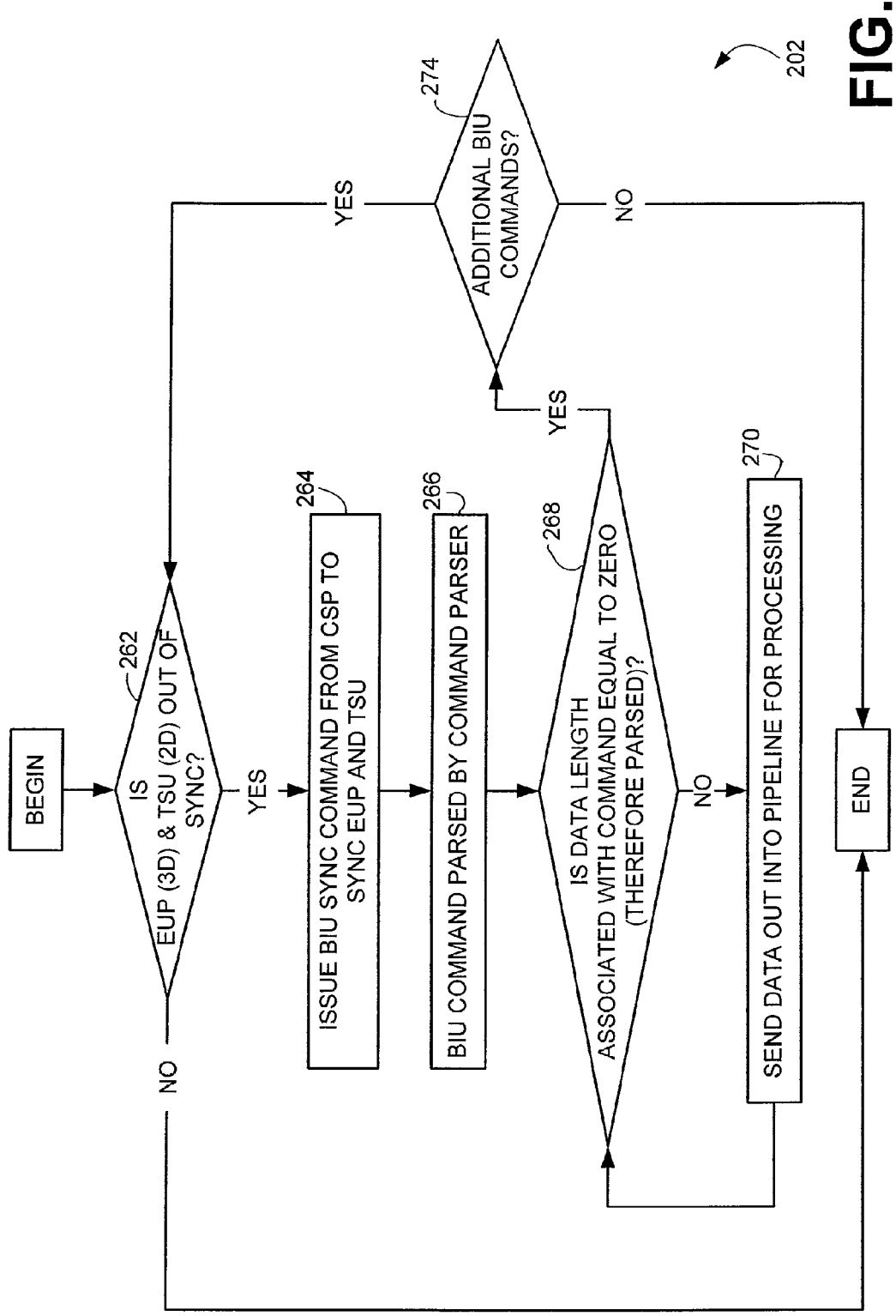
FIG. 9 is a flow chart diagram of the steps that may be configured as executable logic and implemented by command parser of FIG. 5.

In this instance where a bus interface command is received and recognized, shown as in step 187 of FIG. 6, the command parser 150 moves to process 202 of FIG. 9. One of the functions that command parser 150 may execute in regarding to bus interface unit commands is the synchronization of the graphics pipeline 178 with execution units (not shown) that may be configured for 3D application processing. More specifically, the architectural blocks of the graphics pipeline 178 may be configured for processing 2D graphic components while various execution units (not shown) of GPU 84 may be configured for processing more complicated 3D objects for ultimate display on monitor 91. Thus, process 202 may be initiated by determination of whether the execution units (for 3D processing) and the graphics pipeline 178 are out of synch with each other. One of ordinary skill in the art would understand that the various processing units should be synchronized so that related components may be assimilated further down the pipeline for appropriate rendering. Thus, step 262 of FIG. 9 is performed by command parser 150 upon receipt of a bus interface unit and on path 164 so as to determine whether or not the 2D and 3D processing components (such as the execution unit pool (EUP) and the triangle setup unit (TSU), respectively) of GPU 84 are synchronized or not. If they are synchronized or, stated another way, as not out of sync, the process may end and command parser 150 may return to idle state 182 in FIG. 6. However, if the 2D and 3D components of GPU 84 are out of synch, then command parser 150 move to step 264 so as to issue a bus interface unit sync command that synchronizes the execution units and the rest of graphics pipeline 178.

Thereafter, in step 266, the bus interface unit command may be parsed by the command parser 150. A decision step 268 follows wherein a determination is made whether the data length associated with the BIU command is equal to zero or not. If so, the process returns to decision step 262 if additional BIU commands exist to determine whether the 2D and 3D components of GPU 84 are out of synch for the next new command that will follow. But, if the data length is riot equal to zero, which indicates that the BIU is not fully parsed, the command parser 150 may move to step 270 and sends data out into the rest of the graphics pipeline 178 for further processing, as shown in step 270. Steps 268 and 270 may reoccur until the data length is equal to zero. Plus, step 274 may follow for determination whether any remaining BIU commands are available for processing. If not, the process is ended and resort is made to step 182 of FIG. 6, wherein the command parser 150 is idle. However, if so, process 202 moves back to decision step 262 to determine if the 2D and 3D processing components of GPU 84 are out of synch in regard to the next BIU command, as determined in step 274.

Figure 10:
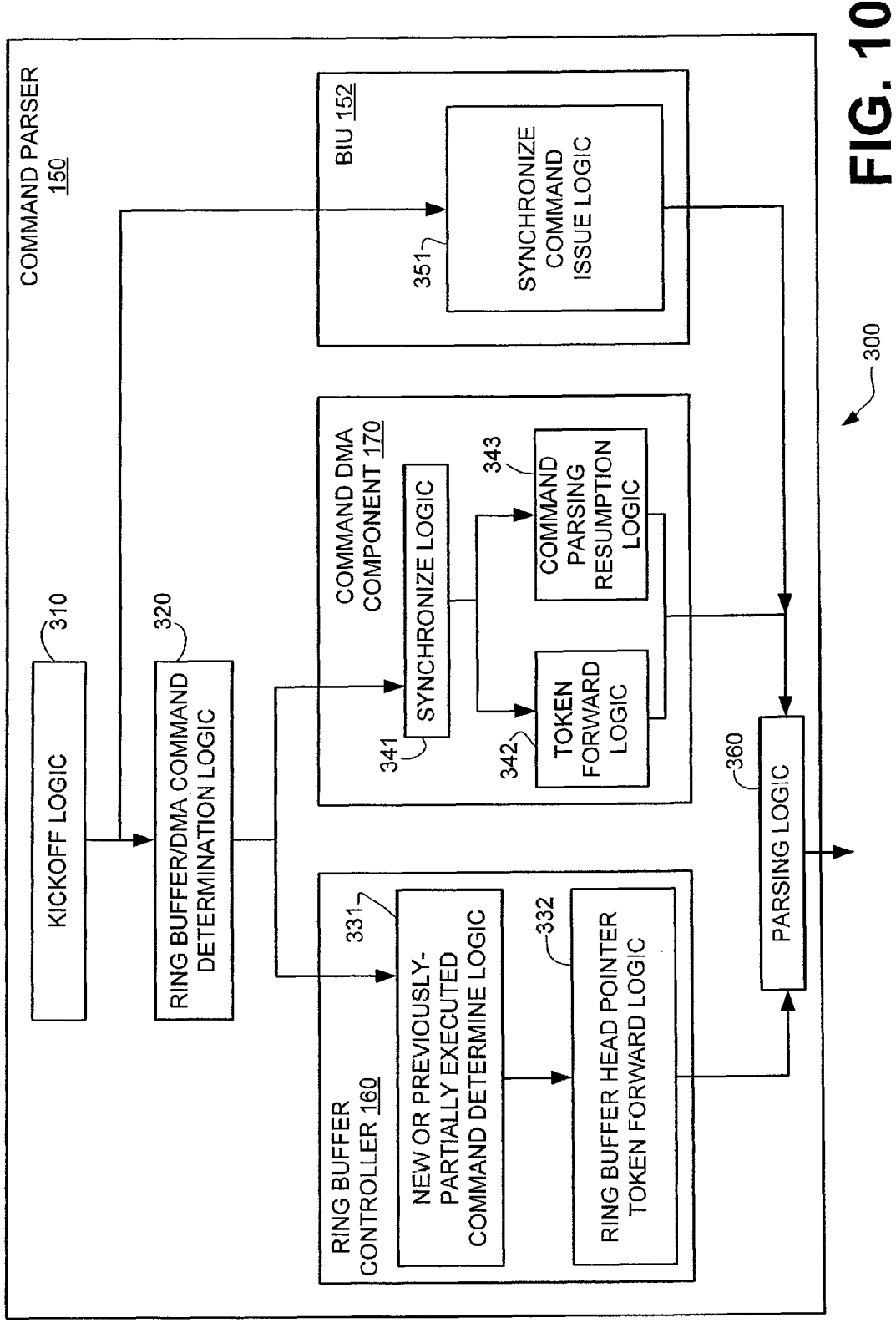
FIG. 10 is a diagram of the command parser of FIG. 5 depicting one nonlimiting exemplary hardware configuration of the executable logic shown in FIGS. 6-9.

FIG. 10 is a diagram of the command parser 150 of FIG. 5 depicting one nonlimiting exemplary hardware configuration 300 of the executable logic shown in FIGS. 6-9. More specifically, the logic steps that may be executed as described above, may be understood in hardware according to their respective components, as shown in FIG. 10 and as one of ordinary skill in the art would know. Thus, aspects of this disclosure may be implemented in software, hardware, firmware, and the like. However, the command parser 150 of FIG. 10 should be understood as depicting merely a portion of the components that may comprise the command parser 150. In this nonlimiting example, the command parser 150 may consist of kickoff logic 310, ring buffer/DMA command determination logic 320, ring buffer controller 160, command DMA component 170, BIU 152 and parsing logic 360. The ring buffer controller 160 may further consist of new or previously-partially executed command determination logic 331 and ring buffer head pointer token forward logic 332. The command DMA component 170 may further consist of synchronize logic 341, token forward logic 342 and command parsing resumption logic 343. The BIU 152 can include a synchronize command issue logic 351.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen, and described to illustrate the principles disclosed herein and the practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

Therefore, based on the disclosure above, at least the following is claimed:

1. A command parser in a graphics processing unit (GPU) for scheduling execution of received commands, comprising:
   a first input coupled to a scheduler, the scheduler being configured to set at least one register of a global command stream processor (CSP) register component based on a type of a bus interface command, the first input configured to communicate bus interface commands for execution by the command parser;
   a second input coupled to a controller that receives a ring buffer command from the scheduler upon receipt by the scheduler of a new or previously-partially executed context of commands and pointers, the command parser configured to execute commands associated with the new or previously-partially executed context of commands and pointers;
   a third input coupled to a command DMA component that receives DMA commands from the controller that are contained in the new or previously-partially executed context of commands and pointers and forwards the DMA commands and a pointer associated to the DMA commands to the command parser; and
   a plurality of outputs, wherein the command parser forwards data in correspondence to commands received on one or more of the first, second, and third inputs.

2. The command parser of claim 1, wherein the ring buffer commands that the controller communicates on the second input to the command parser comprise sync commands, set register commands, and draw commands for the new or previously-partially executed context of commands and pointers.

3. The command parser of claim 1, wherein the command DMA component receives DMA commands extracted from the new or previously-partially executed context of commands and pointers and accesses a data pointer corresponding to the DMA commands that are forwarded to the command parser on the third input.

4. The command parser of claim 1, further comprising:
   kickoff logic configured to remain in an idle state until a kickoff command is received on a predetermined input; and
   parsing logic configured to parse commands in the new or previously-partially executed context of commands and pointers associated with the kickoff command until a first completion of all commands are parsed or the new or previously-partially executed context of commands and pointers is interrupted.

5. The command parser of claim 1, further comprising:
   ring buffer/DMA command determination logic configured to determine whether a communication received on the first, second, or third inputs contains a ring buffer command or a DMA command.

6. The command parser of claim 1, further comprising:
   new or previously-partially executed command determination logic configured to determine whether the new or previously-partially executed context of commands and pointers is new or is previously and partially executed.

7. The command parser of claim 1, further comprising:
ring buffer head pointer token forward logic configured to forward a ring buffer head pointer token from at least one of the outputs of the command parser to a processing unit in the GPU for execution if the new or previously-partially executed context of commands and pointers is a new ring buffer; and
parsing logic configured to parse commands associated with the new context until complete.

8. The command parser of claim 1, further comprising:
command parsing resumption logic configured to resume command parsing when the new or previously-partially executed context of commands and pointers is a previously and partially executed context at a precise point where previously interrupted in accordance with an offset value received from the controller on the second input; and
parsing logic configured to parse commands associated with the previously-partially executed context until complete.

9. The command parser of claim 1, further comprising:
synchronize logic configured to initiate a sequence in the command parser to synchronize a received command DMA component in a graphics pipeline of the GPU when the received command DMA component is communicated from the command DMA component on the third input.

10. The command parser of claim 1, further comprising:
token forward logic configured to forward a token through one of the outputs of the command parser to a graphics pipeline to initiate processing of a first draw command associated with the received DMA command if the new or previously-partially executed context of commands and pointers is a new ring buffer; and
parsing logic configured to parse commands associated with the new context until complete.

11. The command parser of claim 1, further comprising:
synchronize command issue logic configured to issue a synchronize command to a processing block configured for two-dimensional processing and a processing block configured for three-dimensional processing when a bus interface command is received by the command parser on the first input and the processing block configured for two-dimensional processing and the processing block configured for three dimensional processing are unsynchronized.

12. The command parser of claim 11, wherein the bus interface command is parsed and data associated with the bus interface command is communicated from an output of the command parser until no data associated with the bus interface command remains.

13. A method for a command parser adapted to be executed in a graphics processing unit (GPU) to schedule execution of received commands, comprising the steps of:
receiving on a first input of the command parser that is coupled to a scheduler a bus interface command, the scheduler being configured to set at least one register of a global command stream processor (CSP) register component based on a type of a bus interface command;
receiving on a second input of the command parser that is coupled to a controller a ring buffer command associated with new or previously-partially executed context of commands and pointers, wherein a command of the new or previously-partially executed context is parsed;
receiving on a third input of the command parser that is coupled to a command DMA component a DMA command corresponding to the new or previously-partially executed context of commands and pointers; and
sending out an output data associated with data received on one or more of the first, second, and third inputs.

14. The method of claim 13, further comprising the steps of:
forwarding from the controller to the command DMA component a number of DMA commands and pointers associated to the DMA commands contained in the new or previously-partially executed context of commands and pointers; and
retrieving data associated with a DMA buffer referenced by the number of DMA commands and pointers.

15. The method of claim 13, further comprising the steps of:
extracting in a controller a ring buffer command from the new or previously-partially executed context of commands and pointers; and
forwarding the ring buffer command from the controller to the command parser along the second input.

16. The method of claim 13, further comprising the step of:
determining whether a communication received on one of the first, second, or third inputs contains a ring buffer command or a DMA command.

17. The method of claim 13, further comprising the steps of:
determining whether the new or previously-partially executed context of commands and pointers has been previously-partially executed;
initiating processing of the new or previously-partially executed context of commands and pointers at a first command if the context is determined to be new; and
initiating processing of the new or previously-partially executed context of commands and pointers at a point of previous interruption corresponding to an offset value if the context is determined to be previously and partially executed.

18. The method of claim 13, further comprising the steps of:
forwarding a ring buffer head pointer token from a least one of the outputs of the command parser to a processing unit in the GPU for execution if the new or previously-partially executed context of commands and pointers is a new ring buffer; and
parsing commands associated with the new context until complete.

19. The method of claim 13, further comprising the steps of:
resuming command parsing when the new or previously-partially executed context of commands and pointers is a previously and partially executed context at a precise point where previously interrupted in accordance with an offset value received on the second input; and
parsing commands associated with the previously-partially executed context until complete.

20. The method of claim 13, further comprising the step of:
initiating a sequence in the command parser to synchronize a received DMA command in a graphics pipeline of the GPU when a received DMA command is received from the DMA command component on the third input.

21. The command parser of claim 13, further comprising the steps of:
forwarding a token through an output of the command parser through a graphics pipeline of the GPU to initiate processing of a first draw command associated with the received DMA command if the new or previously partially executed context of commands and pointers is a new context; and parsing commands associated with the new context until complete.

22. The command parser of claim 13, further comprising the step of:

issuing a synchronize command to a processing block configured for two-dimensional processing and a processing block configured for three-dimensional processing when a bus interface command is received by the command parser on the first input and the processing block configured for two-dimensional processing and the processing block configured for three dimensional processing are unsynchronized.

23. The method of claim 22, wherein the bus interface command is parsed and data associated with the bus interface command is communicated from an output of the command parser until no data associated with the bus interface command remains.

24. A graphics processing unit, comprising:

a command parser having at least a first, second, and third input and at least one output, the command parser being configured to output data in correspondence to commands received on one of the first, second, or third inputs;

a scheduler coupled to the command parser according to the first input and configured to communicate bus interface commands for execution by the command parser;

a ring buffer controller coupled to the command parser according to the second input and configured to receive a ring buffer command from the scheduler upon receipt by the scheduler of a new or previously-partially executed context of commands and pointers, the command parser configured to execute commands associated with the new or previously-partially executed context of commands and pointers;

a command DMA component coupled to both the command parser by the third input and also to the ring buffer controller, the command DMA component being configured to receive DMA commands from the ring buffer controller that are contained in the new or previously-partially executed context of commands and pointers and to forward the DMA commands and a pointer associated to the DMA commands to the command parser; and a global command stream processor (CSP) register component containing a number of configurable registers and coupled to the scheduler, the scheduler being configured to set at least one register of the global CSP register component based on a type of a bus interface command.

25. The graphics processing unit of claim 24, further comprising:

a pipeline of processing units coupled to at least one output of the command parser.

* * * * *